(12) United States Patent
Stead et al.

(10) Patent No.: US 8,532,486 B2
(45) Date of Patent: Sep. 10, 2013

(54) METHOD AND APPARATUS FOR DETECTING RADIO-FREQUENCY SIGNALS USING A DISPERSIVE FIBER OPTICAL LOOP

(75) Inventors: Michael R. Stead, Gaithersburg, MD (US); Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 47 days.

(21) Appl. No.: 13/371,556

(22) Filed: Feb. 13, 2012

(65) Prior Publication Data

US 2013/0209107 A1  Aug. 15, 2013

(51) Int. Cl.
*H04J 14/00* (2006.01)
*H04B 10/00* (2013.01)

(52) U.S. Cl.
USPC .............................. 398/66; 398/116; 398/59

(58) Field of Classification Search
USPC ............................................ 398/66, 116, 59
See application file for complete search history.

(56) References Cited

U.S. PATENT DOCUMENTS

| | | | | |
|---|---|---|---|---|
| 4,121,212 A * | 10/1978 | Taylor, Jr. | | 342/201 |
| 6,011,506 A * | 1/2000 | Li | | 342/54 |
| 7,061,335 B2 * | 6/2006 | Maleki et al. | | 331/66 |
| 7,728,981 B2 * | 6/2010 | Jolly | | 356/450 |
| 7,777,940 B1 * | 8/2010 | Delfyett et al. | | 359/341.4 |
| 2003/0035187 A1 * | 2/2003 | Richardson et al. | | 359/189 |
| 2004/0156572 A1 * | 8/2004 | Richardson et al. | | 385/1 |
| 2004/0208525 A1 * | 10/2004 | Seydnejad et al. | | 398/33 |
| 2007/0009205 A1 * | 1/2007 | Maleki et al. | | 385/27 |
| 2009/0002236 A1 * | 1/2009 | Zhou | | 342/375 |
| 2010/0259440 A1 * | 10/2010 | Li et al. | | 342/90 |

OTHER PUBLICATIONS

Demonstration of an RF-Photonic Microwave Channelizer Using an Optical Fiber Recirculating Loop, Michael Stead, and Weimin Zbou, Army Research Laboratory, Adelphi MD Minge-Chiang Li, Liceimer, Mitchellville, MD; Dec. 1, 2008.*
"New Channelized Receivers" Ming-Chiang Li, Dec. 2008; 11415 Bayard Drive, Mictchellive, MD 20721.*
"Demonstration of an Rf-Photonic Microwave Channelizer Using an Optical Fiber Recirculating Loop", Michael Stead and Weimin Zhou, Army Research Laboratory, Adelphi MD, and Ming-Chiang Li, Liceimer, Mitchville, MD, 6 Pages, Mar. 10, 2011.
"New Channelized Receiver" Ming-Chiang Li, Transaction of the AOC, 1, pp. 76-97 (2004).

* cited by examiner

*Primary Examiner* — Kenneth N Vanderpuye
*Assistant Examiner* — Abbas H Alagheband
(74) *Attorney, Agent, or Firm* — Alan I. Kalb

(57) ABSTRACT

An apparatus comprising a dispersive fiber optical loop for delaying a first and second sideband, relative to each other, of a light modulated by a radio frequency signal to create a pair of pulses, a coupler for tapping a replica of the pair of pulses from the loop; and an auto-correlation module, coupled to the coupler, for correlating the replica of the pair of pulses with each other.

19 Claims, 2 Drawing Sheets

METHOD AND APPARATUS FOR DETECTING RADIO-FREQUENCY SIGNALS USING A DISPERSIVE FIBER OPTICAL LOOP

GOVERNMENT INTEREST

Governmental Interest—The invention described herein may be manufactured, used and licensed by or for the U.S. Government.

FIELD OF INVENTION

Embodiments of the present invention generally relate to radio-frequency communications and, more particularly, to a method and apparatus for detecting radio-frequency signals using a dispersive fiber optical loop.

BACKGROUND OF THE INVENTION

Typically, public radio-frequency (RF) communications are transmitted at a set frequency so that a receiver can tune to the particular frequency and receive the communications. In contrast, private communications are transmitted across multiple frequencies (e.g., using frequency hopping and/or spread spectrum techniques). In some instances, these private communications need to be captured by unintended receivers, e.g., law enforcement agencies, military organizations and the like. However, difficulties arise when the communications are transmitted across various frequencies, i.e., frequency hopping is employed, in the form of short RF pulses each broadcast on a different frequency.

Without knowing the frequency hopping pattern, a receiver must attempt to capture all signals in the relevant band. Typically, all the signals within the band are digitized and then processed using a very high speed digital signal processing (DSP) system. Such high speed DSP systems are very costly to manufacture, operate and maintain. In some instances, the band of interest is divided into sub-bands and each sub-band is digitized and processed in a corresponding DSP. Such sub-band channelization enables many signals to be quickly processed in parallel using less expensive DSP circuits (i.e., lower speed circuits). However, even a channelized, broad band receiver is very expensive to manufacture, operate and maintain.

Recently, optical systems have found use in broad band signal processing wherein the received RF signals are used to modulate a light signal and the light signal is processed using optical signal processing. Such techniques, unfortunately, are prone to noise and system instability.

Therefore, there is a need in the art for an improved method and apparatus for detecting radio-frequency signals using optical techniques.

BRIEF SUMMARY OF THE INVENTION

Embodiments of the present invention relate to an apparatus comprising a dispersive fiber optical loop for delaying a first and second sideband, relative to each other, of a laser modulated by a radio frequency signal to create a pair of pulses. A coupler taps a replica of the pair of pulses from the loop. An auto-correlation module, coupled to the coupler, correlates the replica of the pair of pulses with each other producing data points. Each transit around the loop produces an additional replica of the pair of pulses, with an augmented delay between them. A Fast Fourier Transform (FFT) module performs an FFT on the data points to obtain a channelized frequency spectrum representing the radio frequency signal.

Another embodiment of the present invention is directed to a method modulating a light with a RF input signal, to produce a modulated light with a first and second sideband, generating a pulse from the modulated light, inputting the pulse into a dispersive fiber optical loop to generate a delay between the first and second sideband, relative to each other, tapping a plurality of time delayed replicas of the pulse from the loop, photo-detecting the time delayed replicas to generate a plurality of RF signal pairs, correlating the plurality of RF signal pairs by correlating each first signal in the pair with a second signal in the pair, generating and storing data points based on the correlating, performing a Fast Fourier Transform on the plurality of stored data points to generate a frequency spectrum.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise a method and apparatus for detecting radio-frequency signals using a dispersive fiber optical loop. Light from a laser is modulated using a received RF signal, which is comprised of multiple frequencies, producing two sidebands. The modulated light is converted into a pulse of light. The pulse circulates through the dispersive optical loop a finite number of times. The dispersive nature of the loop causes the pulse containing both sideband frequencies to propagate through the loop at different speeds for each sideband. As such, after one pass through the loop, there are two pulses each representing a different sideband. For every cycle the pulses take through the fiber, a replica pulse pair is "tapped" from the loop. The tapped pulse pair is photo-detected to create an RF signal; the sidebands in the pulse pair are correlated with each other within an RF mixer, filtered, and then digitized. Once the loop has run multiple times, a Fast Fourier transform (FFT) is performed on the accumulated digitized signals (data points) to generate a channelized frequency spectrum representing information carried by the received RF signals.

Figure 1:
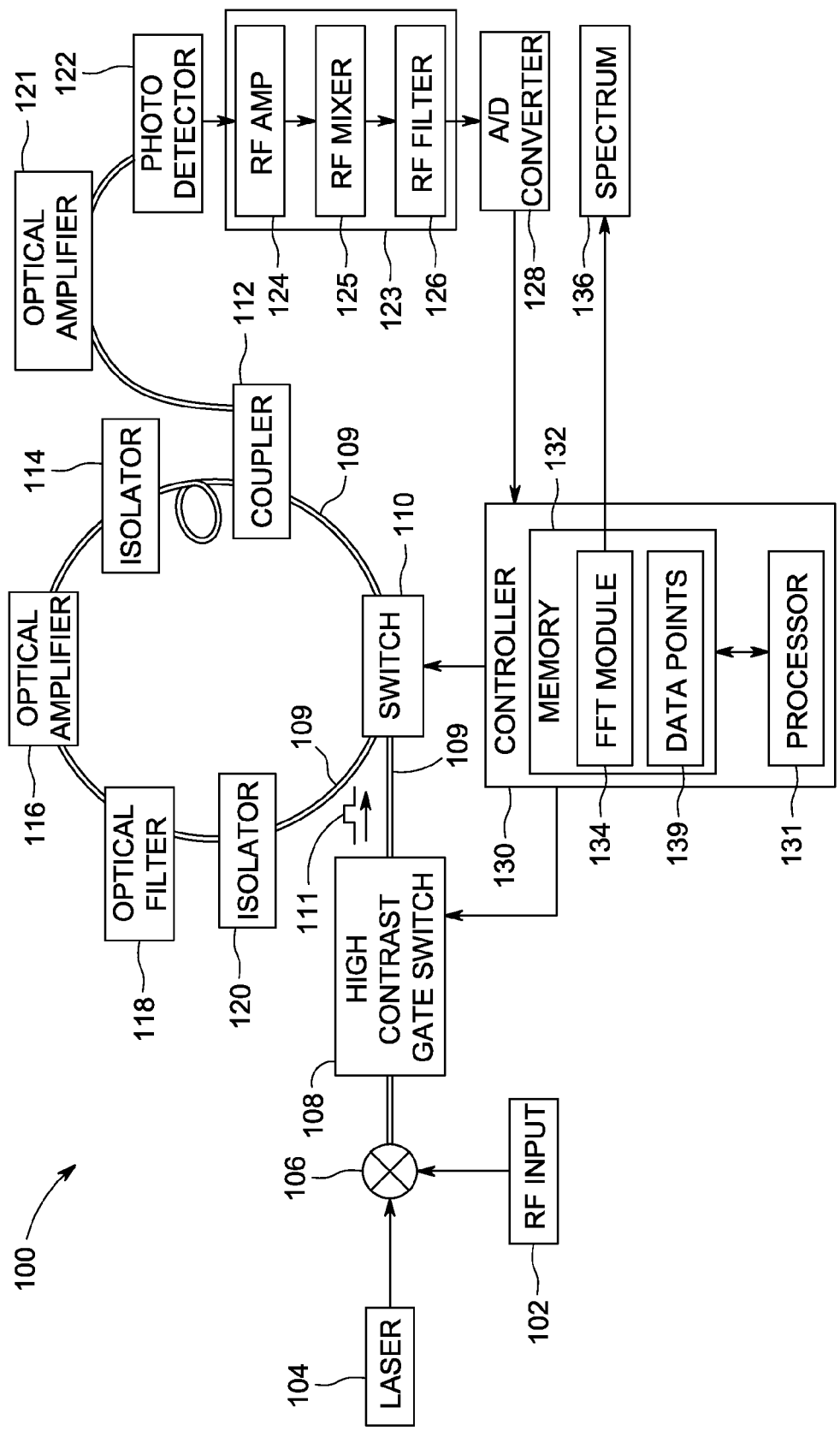
FIG. 1 is a block diagram of an apparatus for detecting radio-frequency signals using a dispersive fiber optical loop.

FIG. 1 is a block diagram of an apparatus 100 for detecting radio-frequency signals using an optical loop. The apparatus 100 comprises a laser 104, an optical modulator 106, a gate switch 108, a 2×1 switch 110, a 1×2 coupler 112, a first isolator 114, an optical amplifier 116, an optical filter 118, a second isolator 120, a photo-detector 122, an auto-correlation module 123 and an analog-to-digital converter (ADC) 128. The apparatus 100 further comprises a controller 130 with memory 132 and an FFT module 134. The apparatus 100 processes an RF input signal 102 and produces a frequency spectrum 136 representing information carried by the RF input signal 102. The RF input signal 102 is an RF signal and the laser 104 is a carrier wave light signal.

The RF input signal 102 may be received via a conventional RF front end (not shown) comprising, for example, an antenna, low noise amplifier and various filters. The choice of components and arrangement depends upon the nature of the signals that are to be processed. The selection of components and their arrangement is a design choice capable of being made by anyone with skill in the RF communication arts.

The optical modulator 106 frequency modulates light from the laser 104 with the RF input signal 102, creating an RF modulated light wave. According to an exemplary embodiment, the laser 104 is a continuous wave laser providing light of frequency $f_0$. Also according to an exemplary embodiment of the present invention, the optical modulator is a Mach Zehnder modulator. The sidebands created by the optical modulator are separated from the light frequency by the frequencies of the RF signals. For example, if an RF input signal has a frequency of 1 GHz, sidebands would be located at $f_0+1$ GHz and $f_0-1$ GHz.

The optical gate switch 108 converts the modulated light into an optical pulse. Optionally, after the switch 108 and before entry into the loop at switch 110, a 1×2 coupler is used to send the pulse signal 111 to another loop. Loops can be cascaded so that pulse signal 111 is multiplexed in the time domain to many copies of apparatus 100 for processing longer pulses. Alternatively, a 1×n switch is coupled to the gate switch 108 with each output of the 1×n switch connected a recirculating fiber loop of differing lengths, allowing an operator of apparatus 100 to select a desired bandwidth for the system.

Once the gate switch 108 generates an optical pulse 111, the pulse 111 enters the beginning portion of the fiber optic recirculating dispersion loop 109. In an exemplary embodiment, the fiber optical dispersion loop 109 is 10 km in length and is fabricated of the SMF-28® ULL fiber from Corning Incorporated of Corning, N.Y. The loop 109 is recirculating because the loop 109 enables the pulse 111 to circle around and re-enter the switch 110 to introduce a time delay caused by dispersive properties of the loop 109. Once the pulse 111 enters the switch 110, the switch 110 closes so further pulses cannot enter the loop 109 causing distortion and noise. A single pulse 111 enters the loop. This single pulse 111 comprises frequency components of both side bands. The dispersive nature of the loop causes each side band to propagate through the loop at a different speed. Consequently, a delay is created between the side bands that creates the two pulses separated by a delay, n Δt, where n is the number of times the pulse has circled the loop and Δt is the time delay formed during a cycle through the loop. According to another exemplary embodiment of the present invention, the gate switch 108 is coupled to a plurality of cascaded fiber optical loops (not shown) for processing longer pulses. In one embodiment, each of these loops is of a different length, determining the frequency band the loops can process.

The loop 109 comprises a coupler 112 that taps a replica of the pulse 111 for further processing, discussed below. In another embodiment of the present invention, the switch 110 and the coupler 112 are combined as a 2×2 coupler, with a first input for the high contrast gate switch 108, a second input for the loop 109, a first output, to tap replica pulses and a second output coupled to the isolator 114.

The pulse signal 111 that remains suffers a signal loss (i.e., coupling loss), so it is coupled to an isolator 114 and an optical amplifier 116 in the loop 109. According to an exemplary embodiment of the present invention, the optical amplifier 116 is an Erbium doped fiber amplifier. The optical amplifier 116 amplifies the pulse 111 to compensate for the coupling loss. Often, an optical amplifier 116 produces reflective pulses, thus the isolator 114 is coupled to the loop 109 prevents these reflections from causing interference in the loop 109. The fiber optical loop 109 is then coupled to an optical filter 118 at the laser 104 wavelength to filter any noise generated by the amplifier 116. The loop 109 is coupled to the isolator 120 for isolating any reflections from the switch 110. In an exemplary embodiment, a polarization rotator is inserted before the coupler 112 to maximize coupling efficiency. In addition, an optional second polarization rotator is used in the loop 109 to allow minimization of polarization dependent effects by not allowing devices in the loop to have polarization dependent loss or gain, i.e., the polarization rotators randomize the polarization of the light propagating in the loop 109.

The pulse 111 (which becomes a pulse pair while in the loop) travels around the loop multiple times, with a replica of the pulse 111 tapped out each time. Due to the dispersion in the fiber, one sideband of the pulse 111 travels slower than the other sideband. The difference in travel time is denoted by Δt, so each loop introduces an additive delay nΔt where n is the current loop iteration, between the sidebands in each successive pulse pair replica. Regular optical fiber causes the spreading apart of optical pulses, i.e., dispersion, by approximately wavelength λ. For the nth pulse pair, the Δt between the two pulses will be nΔt, as discussed above, where $$\Delta t = \frac{LS_0}{\varepsilon}[(\lambda_2^2 - \lambda_1^2) + (\lambda_2^{-2} - \lambda_2^{-2})].$$

Here, L is the loop length, $\lambda_1$ and $\lambda_2$ are the modulation sideband wavelengths and $S_0$ is a constant from the dispersion relation intrinsic to the optical fiber. For the Corning's SMF-28® ULL fiber, $S_o$ is 0.092 ps/(nm² km), although other dispersive fibers can be used.

The tapped pulse pair replicas are coupled to an optional optical amplifier 121 that amplifies the signal for the photodetector 122. The photodetector 122 converts the optical pulse sidebands to a pair of RF pulses. The photo-detector 122 is coupled to an auto-correlation module 123. In one embodiment, auto-correlation module 123 comprises an optional RF amplifier 124 that amplifies the RF signal created by the photodetector 122, an RF mixing element 125 and an RF filter 126. For the $n^{th}$ pulse pair, the two pulse signals are represented as A cos(ω$t_n$) and B cos(ω($t_n$+nΔt)+φ), where A and B are the RF sideband signal amplitudes, ω is the angular frequency of the RF input signal and $t_n$ is the time. In an exemplary embodiment, a portion of output power from the loop 109 before going to the photodetector 122 is used as a negative feedback control for a servo for altering amplification of the amplifier 116, preventing over and under amplification and compensating for drift in the loop 109.

The RF signals are sent to an RF mixing element 125 to multiply together each pulse pair. This is known as an auto-correlation function. In an exemplary embodiment, a square law detector is used as the RF mixing element 125. The RF mixing element 125 integrates many pulses over time. The pulse pairs are auto-correlated to help in finding the presence of repeating patterns and periodic signals in the RF input 102. An optional RF filter 126 filters the high band frequencies, i.e., a low pass filter, yielding just a baseband signal cos (ωnΔt+φ) and the DC signal. A DC block may be used to filter out the DC signal. The baseband signal is coupled to an ADC 128 such that each replicated pulse pair yields a data point for autocorrelation with a different delay between the sidebands. These points are stored in memory 132 as data points 135.

A controller 130 synchronizes the opening and closing of the gate switch 108, the switch 110 and the ADC 129 as well as routing to any additional loops mentioned in the optional configurations. The controller 130 comprises memory 132 and a processor 131, coupled to the memory 132. The memory 132 stores an FFT module 134 and data points 135. In an exemplary embodiment, the memory 132 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The FFT module performs an FFT on the data points from the ADC 128 to generate a channelized frequency spectrum. In the present invention $\Delta t$ is not constant and is dependent on the frequency of the RF input 102. The loop 109 enables the apparatus to create a linear dependency between the $\Delta t$ and RF input 102 frequency. In this manner, the baseband signal $\cos(\omega n\Delta t+\phi)$ can be rewritten $\cos(\omega^2 nC+\phi)$, where C is a constant dependent on the dispersion properties of the loop 109. The FFT module 134 converts data points 135 from the time domain to the frequency-squared domain, from which the frequency data is obtained using well known signal processing techniques.

Figure 2:
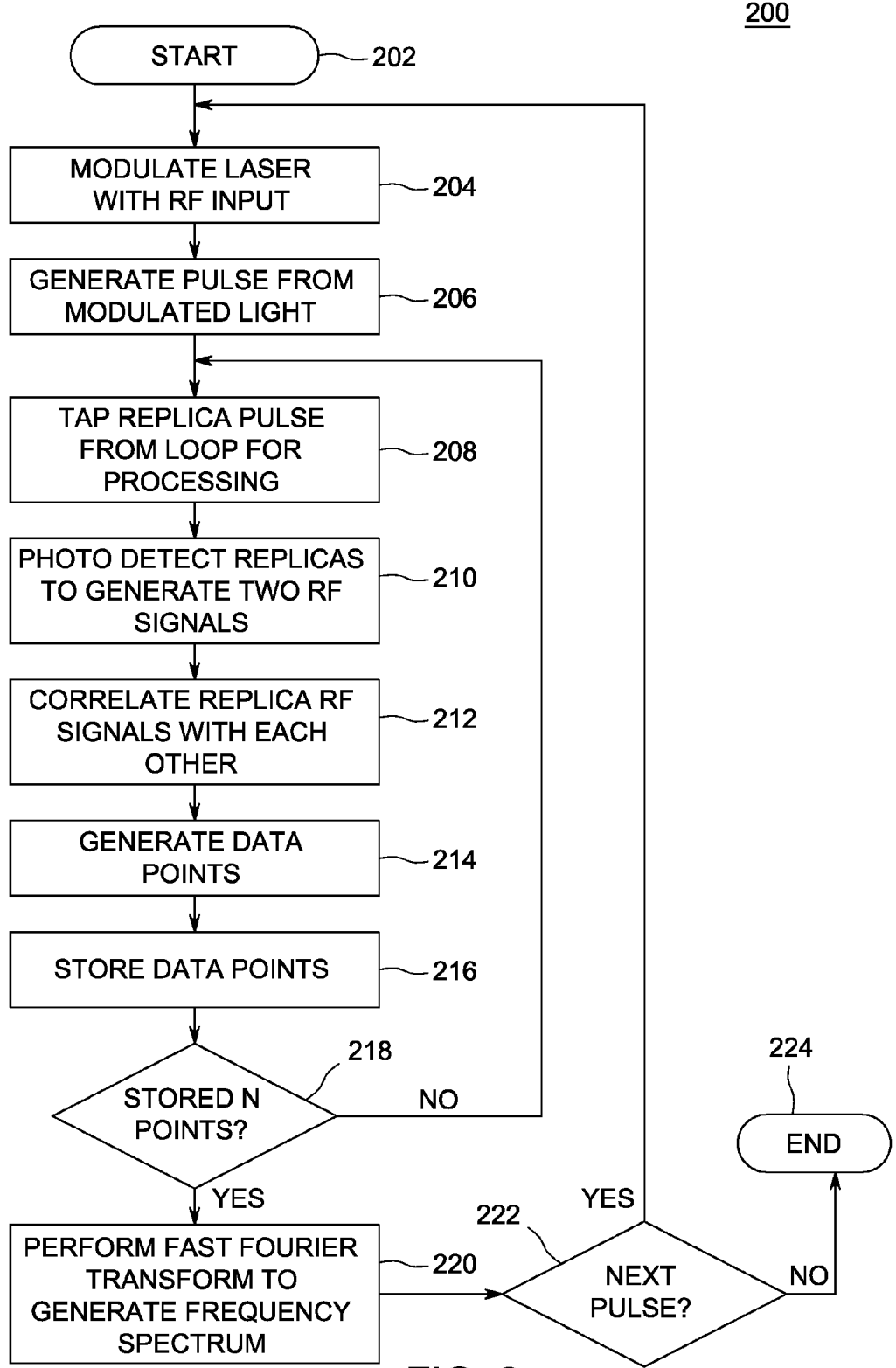
FIG. 2 is a flow diagram of method for detecting radio-frequency signals using a dispersive fiber optical loop.

FIG. 2 is a flow diagram of method 200 for detecting radio-frequency signals using a dispersive optical loop. The method begins at step 202 and proceeds to step 204, where a light from a laser is modulated by an RF input signal using RF modulator 106. At step 206, the switch 108 generates a pulse of the modulated optical signal with a first and second sideband. At step 208, a replica of the pulse is tapped from the loop, while the remaining portion of the pulse re-circulates in the loop.

At step 210, the sideband pulse replica pairs are photo-detected to generate RF signals and then correlated with each other at step 212. The two sidebands have a time delay between them due to the dispersion in the fiber optical loop. At step 214, data points are generated by the ADC 108 to digitize the auto-correlation. The digitized data points are stored at step 216 in memory 132. At step 218, the method determines whether N points have been stored. If N points have not been stored, the method returns to step 208 to tap more pulses from the loop 109. If N points have been stored, the FFT module 134 performs a FFT on the N points to generate a frequency domain spectrum at step 220. At step 222, it is determined whether a new pulse should enter the loop. If so, the method proceeds to step 204 of modulating light from a laser with an RF input. If there are no more pulses, the method ends at step 224. According to an exemplary embodiments, N=500, 1000 or the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. An apparatus comprising:
    a dispersive fiber optical loop for delaying a first and second sideband, relative to each other, of a light modulated by a radio frequency signal to create a pair of pulses;
    a coupler for tapping a replica of the pair of pulses from the loop; and
    an auto-correlation module, coupled to the coupler, for correlating the replica of the pair of pulses with each other,
    a first switch for generating a loop pulse from the modulated light;
    a second switch, coupled to the first switch, for permitting entry of the loop pulse into the loop;
    an amplifier, coupled to the fiber optical loop, for amplifying the remaining loop pulse in the optical fiber loop; and
    a photo-detector, coupled to the coupler, for generating a plurality of first and second RF signal from the replicated pair of pulses; and
    a Fast-Fourier Transform (FFT) module, coupled to the auto-correlation module, for performing an FFT on a plurality of correlated pair of pulses, generating a channelized frequency spectrum based.

2. The apparatus of claim 1 further comprising:
    a first and second isolator, coupled before and after the amplifier, for preventing reflection of the loop pulse in the loop; and
    an optical filter, coupled to the second isolator, with a wavelength equivalent to a wavelength of the light, for filtering noise from the amplifier.

3. The apparatus of claim 1 wherein the auto-correlation module comprises:
    an amplifier for amplifying the first and second RF pulse signals from the photodetector;
    a mixer for multiplying the amplified first and second RF pulse signals; and
    a low pass filter for filtering out high frequencies from the multiplied first and second RF pulse signals.

4. The apparatus of claim 1 wherein the second switch is comprised of:
    a loop switch with a first and second input and an output; and
    a coupler with an input and a first and second output,
    wherein the first input to the loop switch is the output of the amplifier, the second input to the loop switch is the output of the first switch, and
    the coupler input is the loop switch output, the coupler first output is input to the amplifier and the coupler second output taps a replica of the loop pulse for input to the photodetector.

5. The apparatus of claim 1 wherein the first switch is a high contrast gate switch synchronized with the second switch.

6. The apparatus of claim 1 wherein the output of the first switch is coupled to a plurality of cascaded fiber optical loops for processing longer pulses.

7. The apparatus of claim 6 wherein each loop of the plurality of loops has a differing length thereby determining operational bandwidth of each loop and an operator of the apparatus can select a desired operational bandwidth.

8. The apparatus of claim 1 further comprising an analog to digital converter for converting the auto-correlation module output to digital points for the FFT module.

9. The apparatus of claim 3 further comprising:
an analog to digital converter (ADC), coupled to the low pass filter, for converting the multiplied RF pulse signals to digital points for the FFT module.

10. The apparatus of claim 1 further comprising a polarization rotator in the fiber optical loop to reduce polarization dependent effects.

11. The apparatus of claim 1 wherein the output of the first switch is coupled to a plurality of cascaded fiber optical loops for processing longer pulses.

12. The apparatus of claim 1 wherein the first and second switch, the analog to digital converter and the FFT module are controlled by a controller.

13. The apparatus of claim 11 wherein each loop of the plurality of loops has a differing length thereby determining operational bandwidth of each loop and an operator of the apparatus can select a desired operational bandwidth.

14. A method comprising:
modulating a light with a radio-frequency (RF) input signal, to produce a modulated light with a first and second sideband;
generating a pulse from the modulated light;
inputting the pulse into a dispersive fiber optical loop to generate a delay between the first and second sideband, relative to each other;
tapping a plurality of time delayed replicas of the pulse from the loop;
photo-detecting the time delayed replicas to generate a plurality of RF signal pairs;
correlating the plurality of RF signal pairs by correlating each first signal in the pair with a second signal in the pair;
generating and storing data points based on the correlating;
performing a Fast Fourier Transform on the plurality of stored data points to generate a frequency spectrum.

15. The method of claim 14 further comprising amplifying the plurality RF signal pairs.

16. The method of claim 14 further comprising amplifying the pulse in the loop.

17. The method of claim 14 further comprising isolating the pulse in the loop by preventing reflections from the amplifying.

18. The method of claim 15 further comprising filtering the amplified the plurality of RF signal pairs to filter high frequencies.

19. The method of claim 14 wherein the modulated light is input into a plurality of dispersive fiber optical loops of differing length thereby determining frequencies of operation for each loop.

* * * * *